United States Patent
Rickman

(10) Patent No.: US 8,659,390 B2
(45) Date of Patent: Feb. 25, 2014

(54) METHOD AND SYSTEM FOR GENERATING A BIOMETRIC QUERY PLAN

(75) Inventor: Dale M. Rickman, Kensington, MD (US)

(73) Assignee: Raytheon Company, Waltham, MA (US)

( * ) Notice: Subject to any disclaimer, the term of this patent is extended or adjusted under 35 U.S.C. 154(b) by 1077 days.

(21) Appl. No.: 12/535,517

(22) Filed: Aug. 4, 2009

(65) Prior Publication Data

US 2011/0032076 A1 Feb. 10, 2011

(51) Int. Cl.
*H04Q 9/00* (2006.01)
(52) U.S. Cl.
USPC .............................................. 340/5.82
(58) Field of Classification Search
USPC ................. 340/5.82; 382/115, 160, 190, 307
See application file for complete search history.

(56) References Cited

U.S. PATENT DOCUMENTS

| | | | |
|---|---|---|---|
| 5,841,888 A * | 11/1998 | Setlak et al. ............... | 382/124 |
| 5,930,804 A | 7/1999 | Yu et al. | |
| 6,047,281 A * | 4/2000 | Wilson et al. ............. | 1/1 |
| 6,320,974 B1 | 11/2001 | Glaze et al. | |
| 6,505,193 B1 | 1/2003 | Musgrave et al. | |
| 6,993,659 B2 | 1/2006 | Milgramm et al. | |
| 7,184,579 B2 * | 2/2007 | Mizoguchi ................. | 382/124 |
| 7,277,891 B2 | 10/2007 | Howard et al. | |
| 7,298,873 B2 | 11/2007 | Miller, Jr. et al. | |
| 8,296,573 B2 * | 10/2012 | Bolle et al. ................ | 713/186 |
| 2006/0104485 A1 | 5/2006 | Miller, Jr. et al. | |
| 2007/0098223 A1 | 5/2007 | Kamata et al. | |
| 2008/0049983 A1 | 2/2008 | Miller et al. | |
| 2008/0059807 A1 | 3/2008 | Miller et al. | |

\* cited by examiner

*Primary Examiner* — Vernal Brown
(74) *Attorney, Agent, or Firm* — Christie, Parker & Hale, LLP

(57) ABSTRACT

According to one embodiment, a computer-readable medium includes computer-executable instructions that, when executed by a computer, are configured to receive biometric sample quality information. The biometric sample quality information describes quality of one or more biometric samples. Search performance parameters are received. A biometric query plan is generated in compliance with the search performance parameters. The biometric query plan provides a search plan for identifying potential matches to the one or more biometric samples.

30 Claims, 1 Drawing Sheet

METHOD AND SYSTEM FOR GENERATING A BIOMETRIC QUERY PLAN

TECHNICAL FIELD

This invention relates generally to the field of identification systems and more specifically to a method and system for generating a biometric query plan.

BACKGROUND

Biometrics systems may uniquely recognize humans based upon one or more intrinsic physical and/or behavioral traits. For example, biometric systems may use physical and/or behavioral traits as a form of verification and/or identification. Biometric verification and identification systems may be used in a variety of applications.

SUMMARY OF THE DISCLOSURE

According to one embodiment, a computer-readable medium includes computer-executable instructions that, when executed by a computer, are configured to receive biometric sample quality information. The biometric sample quality information describes quality of one or more biometric samples. Search performance parameters are received. A biometric query plan is generated in compliance with the search performance parameters. The biometric query plan provides a search plan for identifying potential matches to the one or more biometric samples.

Certain embodiments of the invention may provide one or more technical advantages. A technical advantage of one embodiment may include the capability to execute biometric queries based on specified performance parameters. Yet other technical advantages may include the capability to customize biometric queries by modifying performance parameters. Yet other technical advantages may include the capability to execute multi-modal biometric queries. Yet other technical advantages may include the capability to increase biometric query speed, reduce processing resources, and increase accuracy of identification.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Using biometric systems to verify and/or identify a human subject may be difficult to accomplish for a variety of reasons. For example, biometric systems may include mechanisms for matching a biometric sample to one or more records in a gallery of biometric samples. However, poor-quality biometric samples may limit the accuracy of biometrics and cause matching errors. Additionally, searching a biometric sample gallery may be more difficult because biometric samples may not be searchable according to an index or a key. Furthermore, biometric search managers may not be able to perform multi-modal searches using multiple biometric samples because they cannot prioritize query functions. Thus, brute-force biometric searches may be slow, resource-intensive, and inaccurate.

Accordingly, teachings of certain embodiments may recognize the capability to select, execute, and/or modify biometric matching queries according to specified parameters. Teachings of certain embodiments may also recognize the capability to prioritize biometric matching queries according to user requirements, such as speed or accuracy. Teachings of certain embodiments may also receive multiple biometric sample inputs and generate prioritized biometric matching queries based on these inputs.

Figure 1:
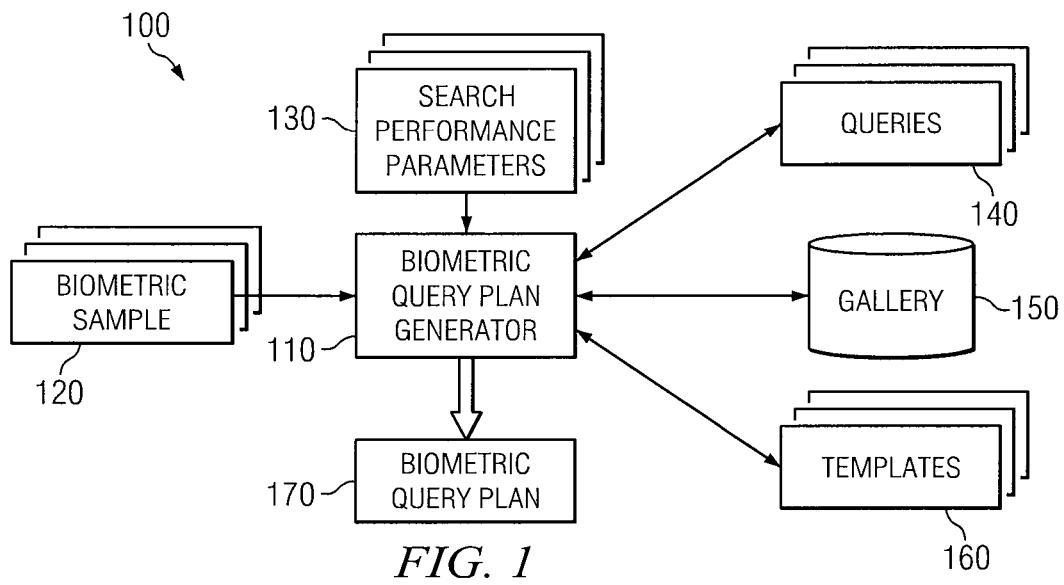
FIGS. 1 and 2 show a system and method for generating a biometric query plan according to one embodiment.
Figure 2:
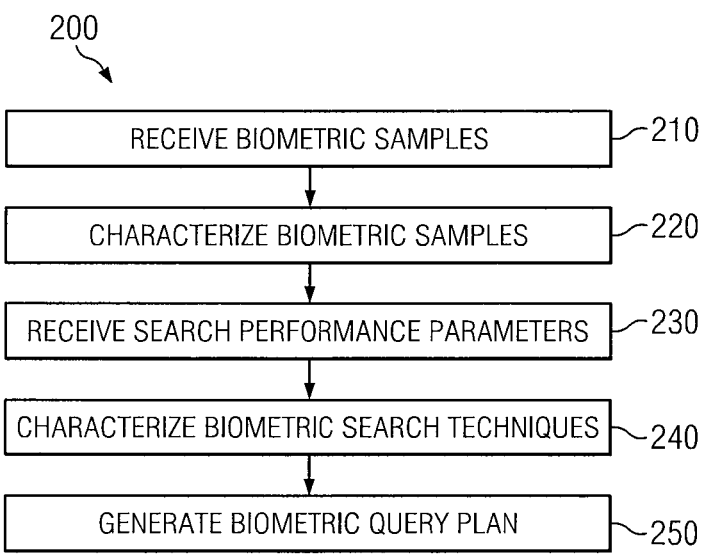

FIGS. 1 and 2 show a system and method for generating a biometric query plan according to one embodiment. FIG. 1 shows a biometric query plan system 100 featuring a biometric query plan generator 110, one or more biometric samples 120, one or more search performance parameters 130, one or more queries 140, a gallery 150, and one or more templates 160. In this embodiment, the biometric query plan generator 110 may create a biometric query plan 170.

The biometric samples 120 of system 100 may include any suitable biometric samples. For example, the biometric samples 120 may be of any suitable modality. A biometric modality is a type or class of biometric system. Examples of biometric modalities may include, but are not limited to, face, fingerprint, gait, hand geometry, iris, keystroke dynamics, signature, and vascular modalities.

The gallery 150 of system 100 may include any suitable gallery of potential matches. For example, the gallery 150 may include a repository of biometric samples that are linked to the identity of a known human subject. For example, the gallery 150 may include fingerprint biometrics received from a department of motor vehicles or other state department that records fingerprint scans when issuing state driver's licenses. In another example, the gallery 150 of biometric samples may not be linked to the identity of a known human subject. For example, the gallery 150 may include fingerprint biometrics recovered from different crime scenes. In this example, matching a biometric sample 120 to a biometric sample from the gallery 150 may prove that a human subject participated in crimes at two different locations, even if the identity of the human subject is still unknown.

The queries 140 may represent any suitable techniques for identifying potential matches to one or more biometric samples, such as the biometric sample 120, from a gallery, such as the gallery 150. One example query 140 may include a filter query. In this example, a filter query may filter through biometric samples from the gallery 150 for potential matches. In some embodiments, the filter query may be characterized according to filter level. For example, a broad filter may return a large number of potential matches, whereas a narrow filter may return a small number of potential matches. In some embodiments, filtering may also include the technique of identifying one biometric to be used to set the gallery 150 to be checked for another biometric, such as the biometric sample 120.

Further details regarding embodiments of the elements of system 100 will be discussed in greater detail with respect to FIG. 2.

FIG. 2 shows one embodiment of a method 200 for generating a biometric matching query plan using the system 100 of FIG. 1. At step 210, one or more of the biometric samples 120 are received.

In some embodiments, multiple biometric samples 120 may be received. Teachings of certain embodiments recognize that identifying a human subject using multiple biometric samples may improve accuracy and/or yield faster results. In some embodiments, biometric samples 120 of two or more different modalities may be received. For example, in one embodiment, a human subject may provide a fingerprint biometric and a face biometric.

Teachings of certain embodiments recognize that biometric samples may vary in quality. For example, one potential mechanism for identifying a fingerprint biometric may include analyzing specific points on a fingerprint scan. However, two scans of the same finger may not reveal the same points. For example, the human subject may apply a different amount of pressure on the fingerprint scanner, thus potentially deforming the fingerprint scan. In another example, fingerprint scans may be generated from different fingerprint scanners, thus potentially producing fingerprint scans of different qualities.

Teachings of certain embodiments recognize that differences in biometric sample quality may affect the accuracy and speed of some biometric searching techniques. For example, poor sample quality may be responsible for matching errors and may be a major weakness in some implementations. Also, using some matching techniques, poor sample quality may take longer to match than higher quality samples. Teachings of certain embodiments also recognize that, although some matching techniques may work well for high-quality biometric samples, other techniques may be better suited for matching low-quality biometric samples.

Accordingly, at step 220, the biometric samples 120 are characterized. For example, in some embodiments, the biometric samples 120 are characterized according to sample quality. In some embodiments, quality categories may be used to characterize sample quality. For example, one embodiment may feature quality categories such as very good, good, poor, and very poor. Other embodiments may include more detailed quality categories, such as quality categories representing quality issues for specific biometric modalities.

In another example embodiment, biometric samples 120 may be characterized by reference to a biometric matching technique. For example, one embodiment may feature quality categories such as High, MedHigh, MedLow, and Low. In this example, High indicates that the quality of the biometric sample 120 is very good and that the biometric matching technique should perform well with this sample. MedHigh indicates that the quality of the biometric sample 120 is good and that the biometric matching technique should be able to use the sample. MedLow indicates that the quality of the biometric sample 120 is poor and that the biometric matching technique may not perform well with this sample. Low indicates that the quality of the biometric sample 120 is very poor and that the biometric matching technique may not be able to provide any useful results using this sample.

In some embodiments, sample quality may also include other characteristics regarding the biometric sample 120. In one illustrative example, the biometric sample 120 may include a face biometric. In this illustrative example, some biometric matching techniques may be specialized for matching faces of certain ethnicities. Accordingly, the biometric sample 120 may be characterized according to ethnicity such that an appropriate matching technique may be selected for the biometric sample.

In some embodiments, other data may be available to characterize the biometric sample 120. For example, biographic information may be used to describe the biometric sample. Biographic information may include, but is not limited to, a name, description of physical appearance, and credentials associated with a biometric sample. For example, in some scenarios, a human subject may provide both a biometric sample 120 and a form of identification, such as a drivers license; in this example, the identification information may be used to formulate or identify biometric search queries and/or confirm data associated with potential query matches.

In another example, the biographic data may include a description of physical appearance, such as a height estimation. In one illustrative example, a technician charged with collecting a biometric sample 120 may estimate the height of the human subject. In this illustrative example, the human subject may be five foot, six inches, and the query mechanism may limit potential matches to the biometric sample 120 to those that matches correspond to human subjects that are between five foot, two inches, and five foot, ten inches.

Other data is not limited to just biographic data. For example, in one embodiment, data associated with the biometric sample 120 may identify where the biometric sample 120 was first provided by a human subject. In one illustrative example, the human subject may provide a fingerprint biometric at an airport. Biometric search techniques may then use this location information to limit biometric searches, such as limiting searches to a gallery 150 of people living in the state of that airport or to a gallery 150 of people scheduled to be traveling through the airport.

Methods for generating a biometric matching query plan are not limited to steps 210 and 220. For example, in some embodiments, rather than receiving biometric samples and then characterizing those samples, steps 210 and 220 may include receiving characteristics of the biometric samples without receiving the samples themselves. Thus, in some embodiments, characterization of the biometric samples 120 may be delegated to an external system.

Different biometric searching techniques may vary in search performance. Teachings of certain embodiments recognize the capability to identify optimal biometric matching techniques, such as the queries 140 of FIG. 1, using search performance parameters. Accordingly, at step 230, search performance parameters 130 are received. Embodiments of the search performance parameters 130 may include any suitable parameters. For example, in some embodiments of the search performance parameters 130 may include optimized search parameters, such as response time, potential match accuracy, and/or required computing resources. For example, in one embodiment, the search performance parameters 130 may specify that a searching technique yield the most accurate results available or yield results in the shortest amount of time.

In some embodiments, the search performance parameters 130 may represent preferred or required parameters. For example, a preferred search performance parameter may specify that a searching technique attempt to achieve a certain goal, such as performing a query in under a specified period of time. A required search performance parameter, on the other hand, may specify that a searching technique must achieve a certain goal, such as performing the query under a specified period of time.

At step 240, biometric search techniques are characterized. In some embodiments, the biometric search techniques may include the queries 140 of FIG. 1.

In some embodiments, biometric search techniques may be characterized according to speed and/or match accuracy. In some embodiments, characterization of biometric search techniques may account for variables including, but not limited to, filtering level, sample quality, and gallery sizes. As one illustrative example, a biometric search technique for searching face biometrics may be faster when performing narrow searches of a medium-size face gallery using a good sample, but the results may be less accurate because potential matches may be missed due to a narrow filtering level. In another example, the biometric search technique for searching face biometrics may be accurate when performing broad searches of the medium-size gallery using multiple data points from a good sample, but the biometric search technique may be more time-intensive due to a broad filtering level.

In some embodiments, step 240 may include active characterizing biometric search techniques; however, in other embodiments, step 240 may include receiving or identifying biometric search techniques that have already been characterized. In another embodiments, step 240 may include receiving characterization information regarding biometric search techniques without actually receiving the techniques themselves.

As stated above, different biometric search techniques may have different accuracy levels. Furthermore, these accuracy levels may change depending on characteristics of the biometric sample 120 and/or the gallery 150. Accordingly, teachings of certain embodiments recognize the use of biometric matching scores. In some embodiments, biometric matching scores may characterize the accuracy of potential matches identified when searching a gallery 150 for potential matches to a biometric sample 120 using a specified search technique.

In one illustrative embodiment, the following six biometric matching score levels may be used: VeryHigh, High, MedHigh, Med, MedLow, Low. In this example, VeryHigh indicates that a potential match has a higher than probable outcome that the potential match is an actual match. A higher than probable match may occur, for example, during identity verification when using biographical or other information. High indicates a realistic value and a high probability of an actual match. MedHigh indicates that the potential match is above a match threshold but below a High probability. Med indicates that the potential match is below the match threshold but above the non-match threshold. MedLow indicates that the potential match is below the non-match threshold, implying that the biometric sample 120 did not match anyone in the gallery 150. Low indicates a high probability non-match.

Teachings of steps 210 through 240 recognize that biometric search performance may be affected by several variables, including, but not limited to, biometric sample quality and biometric search technique. For example, different biometric search techniques may be faster and/or more accurate when identifying matches to different biometric samples. Accordingly, teachings of certain embodiments recognize the capability to generate a biometric search plan to optimize biometric searches based on variables that impact biometric search performance.

At step 250, the biometric query plan generator 110 generates the biometric query plan 170. The biometric query plan 170 may be any suitable plan. For example, in one embodiment, the biometric query plan 170 may identify one or more queries 140 to perform on the gallery 150 using the biometric sample 120. In some embodiments, the biometric query plan 170 may generated in response to the search performance parameters 130. For example, in one embodiment, the search performance parameters 130 may identify accuracy as the primary criteria, and the biometric query plan generator 110 may develop an optimally-accurate biometric query plan 170.

The biometric query plan generator 110 may generate the biometric query plan 170 using any suitable logical structure. For example, in some embodiments, the biometric query plan 170 may be based on decision trees or rules engines. For example, in some embodiments, paths taken through a decision tree may be based on inputs such as the biometric sample 120 and/or the search performance parameters 130.

In some embodiments, the biometric query plan generator 110 may be parameterized. Teachings of certain embodiments recognize that parameterization may enable the biometric query plan generator 110 to accept any biometric samples of any modality and/or generate biometric query plans using any available query techniques. For example, in one embodiment, the biometric query plan generator 110 may receive parameters in the form of biometric sample quality scores and biometric search technique characterizations. In this example, the biometric query plan generator 110 may select one or more queries by comparing the biometric search technique characterizations to the biometric sample quality scores. Teachings of certain embodiments recognize that, because the biometric query plan generator 110 may generate biometric query plans 170 using parameters, the biometric query plan generator 110 is not dependent on any particular biometric samples or query techniques. For example, in a parameterized embodiment, the biometric query plan generator 110 may be able to accept any biometric modality as long as each modality is characterized according to the same biometric quality scoring system.

In some embodiments, the biometric query plan generator 110 may be offered as a component in a service-oriented architecture. For example, in some embodiments the biometric query plan generator 110 may be paired as a component with a biometric matching engine. In this example, the biometric matching engine may accept a biometric identification request and request a biometric query plan 170 from the biometric query plan generator 110.

In some deployments, a user may wish to execute multiple biometric searches using multiple biometric samples 120. In many of these searches, the applicable biometric query plan 170 may be the same or similar. For example, in some embodiments, the same biometric query plan 170 may be used when performing searches using similar biometric samples 120, the same search performance parameters 130, and the same gallery 150. Rather than generate a new biometric query plan 170 for each set of biometric samples 120, teachings of certain embodiments recognize that reusing a biometric query plan 170 may increase response time and reduce computer resource usage.

In some embodiments, the biometric query plan generator may use templates 160 to simplify generation of the biometric query plan 170. For example, in some embodiments, the biometric query plan generator 110 may incorporate a template 160 as a part of the biometric query plan 170 rather than generating the biometric query plan 170 from scratch. In one illustrative example, the search performance parameters 130 may identify accuracy as the primary criteria; the biometric query plan generator 110 may then call use an "accuracy template" to help generate the biometric query plan 170.

Embodiments of the templates 160 may include any suitable elements used to generate a biometric query plan 170. For example, in some embodiments, the templates 160 may include computer-executable code, such as code configured to call and/or execute biometric queries.

Teachings of certain embodiments also recognize that allowing a user to provide, select, and customize templates 160 may provide further customization of biometric query plan customization. For example, in some embodiments, a user may customize performance of the biometric query plan generator 110 by providing custom templates 160. For example, if a user has developed a query plan that works well with other components in a biometric system, the user may substitute the template 160 for one or more elements of a generated biometric query plan 170. In some embodiments, a user may identify a preferred template 160 in the search performance parameters 130. In some embodiments, an administrator may define access parameters for the templates 160; for example, an administrator may wish to deny access to some templates 160 because they use too many computing resources.

Two example implementations are provided to illustrate how the system 100 may generate a biometric query plan. In the first example, the biometric samples 120 may be a Med-Low single finger biometric and a MedHigh face biometric. The search performance parameters 130 may specify that response time is a priority and that the accuracy should be grater than that can be accomplished with just a face matching query. Because speed is a priority, the biometric query plan generator 110 may send the face biometric to a face-matching query, setting a high-false accept rate threshold that ensures that the matching entry will be returned if the entry is in the face-matching gallery. The biometric query plan generator 110 may then send the returned potential matches and the single finger biometric to a fingerprint matching engine, which is used as the gallery. In this example, limiting the fingerprint biometric to just the gallery returned by the face query improves response time and minimizes processing requirements. Next, the candidate list returned by the fingerprint matching engine may be sent with the potential matches from the face-matching query to a fusion engine, which will determine the final match.

In the second example, the biometric samples 120 may be a MedHigh fingerprint biometric, a MedHigh iris biometric, and a High face biometric. The search performance parameters 130 may specify that accuracy is the priority and that response time is less important. Based on the accuracy requirement, the biometric query plan generator 110 may send the iris biometric to an iris matcher. The iris matcher may then return a MedHigh score for one entry. In this example, the high accuracy requirements of the search performance parameters 130 are not met, so the biometric query plan generator 110 sends the fingerprint biometric to a fingerprint matcher and requests verification with the person identified by the iris matcher. The fingerprint matcher also returns a MedHigh matching score. An external fusion engine determines that the person identified above is above the required accuracy, and the biometric query plan generator 110 thus determines that the face biometric will not be used.

Figure 3:
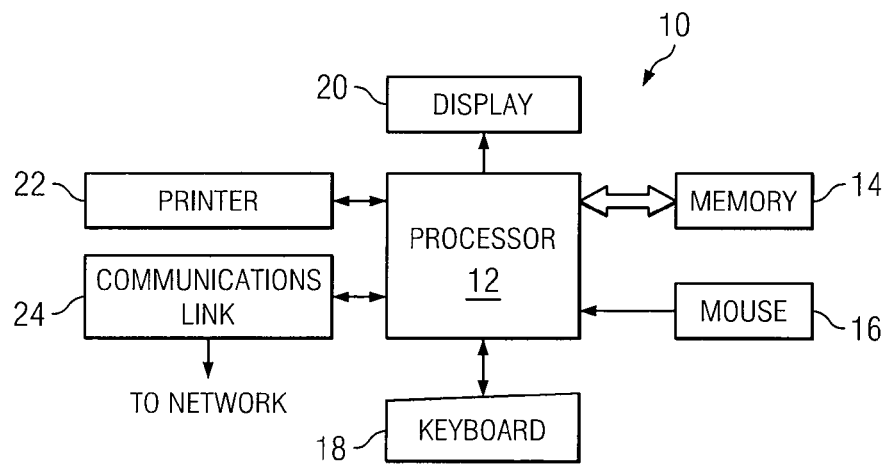
FIG. 3 presents an embodiment of a general purpose computer operable to perform one or more operations of various embodiments of the invention.

FIG. 3 presents an embodiment of a general purpose computer 10 operable to perform one or more operations of various embodiments of the invention. The general purpose computer 10 may generally be adapted to execute any of the well-known OS2, UNIX, Mac-OS, Linux, and Windows Operating Systems or other operating systems. The general purpose computer 10 in this embodiment comprises a processor 12, a memory 14, a mouse 16, a keyboard 18, and input/output devices such as a display 20, a printer 22, and a communications link 24. In other embodiments, the general purpose computer 10 may include more, less, or other component parts.

Several embodiments may include logic contained within a medium. Logic may include hardware, software, and/or other logic. Logic may be encoded in one or more tangible media and may perform operations when executed by a computer. Certain logic, such as the processor 12, may manage the operation of the general purpose computer 10. Examples of the processor 12 include one or more microprocessors, one or more applications, and/or other logic. Certain logic may include a computer program, software, computer executable instructions, and/or instructions capable being executed by the general purpose computer 10. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 14. The memory 14 may comprise one or more tangible, computer-readable, and/or computer-executable storage medium. Examples of the memory 14 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The communications link 24 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

Although the illustrated embodiment provides one embodiment of a computer that may be used with other embodiments of the invention, such other embodiments may additionally utilize computers other than general purpose computers as well as general purpose computers without conventional operating systems. Additionally, embodiments of the invention may also employ multiple general purpose computers 10 or other computers networked together in a computer network. For example, multiple general purpose computers 10 or other computers may be networked through the Internet and/or in a client server network. Embodiments of the invention may also be used with a combination of separate computer networks each linked together by a private or a public network.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A non-transitory computer-readable medium having computer-executable instructions for execution by a computer, the computer-executable instructions adapting the computer to:

receive first and second biometric sample quality information for respectively first and second biometric samples, the first and second biometric sample quality information describing quality of respectively the first and second biometric samples, the first and second biometric samples for being compared against a gallery of biometric samples for a potential match;

receive search performance parameters;

match a first biometric search query to the first biometric sample based on the first biometric sample quality information so that performance of the first biometric search query, when identifying first potential matches from the gallery to the first biometric sample, complies with a first one of the search performance parameters, wherein the first biometric search query is configured to employ a first searching technique for identifying the first potential matches;

match a second biometric search query to the second biometric sample based on the second biometric sample quality information so that performance of the second biometric search query, when identifying second potential matches from the gallery to the second biometric sample, complies with a second one of the search performance parameters, wherein the second biometric search query is configured to employ a second searching technique for identifying the second potential matches, wherein the second biometric search query is different from the first biometric search query; and generate a biometric query plan including the first or second biometric search query for identifying potential matches to the one or more biometric samples.

2. The computer-readable medium of claim 1, wherein the first biometric search query is configured to search the gallery of biometric samples to generate a first group of potential matches, and the second biometric search query is configured to limit the search to the first group of potential matches to identify a second group of potential matches.

3. The computer-readable medium of claim 1, wherein the first or second one of the search performance parameters comprises preferred performance parameters, the preferred performance parameters identifying search performance goals for the biometric query plan.

4. The computer-readable medium of claim 1, wherein the first or second one of the search performance parameters comprises required performance parameters, the required performance parameters identifying search performance requirements for the biometric query plan.

5. The computer-readable medium of claim 1, the first or second one of the search performance parameters requesting an optimized biometric search plan according to a specified performance parameter.

6. The computer-readable medium of claim 5, wherein the specified performance parameter is selected from a group consisting of search response time, potential match accuracy, and required computing resources.

7. The computer-readable medium of claim 1, the instructions further configured to receive biographic data, the biographic data and the first or second biometric samples corresponding to the same human subject, the biometric query plan providing a search plan for identifying potential matches to the first or second biometric samples and the biographic data.

8. The computer-readable medium of claim 1, the instructions further configured to generate the biometric query by optimizing the biometric query plan based on the first or second biometric sample quality information.

9. The computer-readable medium of claim 8, the biometric query plan selecting the first or second biometric search queries based on respectively the first or second sample quality.

10. The computer-readable medium of claim 1, wherein the first and second biometric samples correspond to the same human subject, the biometric query plan providing a search plan for identifying potential matches to the first and second biometric samples.

11. The computer-readable medium of claim 10, wherein the first and second biometric samples are of different biometric modalities.

12. The computer-readable medium of claim 1, the instructions further configured to generate the biometric query plan by offering to generate the biometric query plan as a service oriented architecture component.

13. The computer-readable medium of claim 1, wherein the quality of the first or second biometric sample quality is characterized by reference to respectively the first or second biometric search queries.

14. The computer-readable medium of claim 1, the instructions further configured to receive the first or second biometric sample quality information, the first or second biometric sample quality information describing quality of respectively the first or second biometric samples by:

receiving the first or second biometric samples; and assessing the first or second biometric sample quality of the first or second biometric samples.

15. The computer-readable medium of claim 2, wherein the computer-executable instructions adapt the computer to prioritize the biometric search queries so that the first biometric search query is executed prior to executing the second biometric search query.

16. The computer-readable medium of claim 1, wherein the first searching technique is different from the second searching technique, and wherein the first one of the search performance parameters is different from the second one of the search performance parameters.

17. A method for generating a biometric query plan, comprising:

receiving by a computer system first and second biometric sample quality information for respectively first and second biometric samples, the first and second biometric sample quality information describing quality of respectively the first and second biometric samples, the first and second biometric samples for being compared against a gallery of biometric samples for a potential match;

receiving by the computer system search performance parameters;

matching by the computer system a first biometric search query to the first biometric sample based on the first biometric sample quality information so that performance of the first biometric search query, when identifying first potential matches from the gallery to the first biometric sample, complies with a first one of the search performance parameters, wherein the first biometric search query is configured to employ a first searching technique for identifying the first potential matches;

matching by the computer system a second biometric search query to the second biometric sample based on the second biometric sample quality information so that performance of the second biometric search query, when identifying second potential matches from the gallery to the second biometric sample, complies with a second one of the search performance parameters, wherein the second biometric search query is configured to employ a second searching technique for identifying the second potential matches, wherein the second biometric search query is different from the first biometric search query; and generating by the computer system a biometric query plan including the first or second biometric search query for identifying potential matches to the one or more biometric samples.

18. The method of claim 17,
wherein the first biometric search query is configured to search the gallery of biometric samples to generate a first group of potential matches, and the second biometric search query is configured to limit the search to the first group of potential matches to identify a second group of potential matches.

19. The method of claim 17, wherein the first or second one of the search performance parameters comprises preferred performance parameters, the preferred performance parameters identifying search performance goals for the biometric query plan.

20. The method of claim 17, wherein the first or second one of the search performance parameters comprises required performance parameters, the required performance parameters identifying search performance requirements for the biometric query plan.

21. The method of claim 17, the first or second one of the search performance parameters requesting an optimized biometric search plan according to a specified performance parameter.

22. The method of claim 21, wherein the specified performance parameter is selected from the group consisting of search response time, potential match accuracy, and required computing resources.

23. The method of claim 17, further comprising:
receiving biographic data, the biographic data and the first or second biometric samples corresponding to the same human subject, the biometric query plan further providing a search plan for identifying potential matches to the first or second biometric samples and the biographic data.

24. The method of claim 17, wherein the generating the biometric query further comprises optimizing the biometric query plan based on the first or second biometric sample quality information.

25. The method of claim 24, the biometric query plan selecting the first or second biometric search queries based on respectively the first or second sample quality.

26. The method of claim 17,
wherein the first and second biometric samples correspond to the same human subject, the biometric query plan providing a search plan for identifying potential matches to the first and second biometric samples.

27. The method of claim 26, wherein the first and second biometric samples are of different biometric modalities.

28. The method of claim 17, wherein the generating the biometric query plan further comprises offering to generate the biometric query plan as a service oriented architecture component.

29. The method of claim 17, wherein the quality of the first or second biometric sample quality is characterized by reference to respectively the first or second biometric search queries.

30. The method of claim 17 further comprising receiving the first or second biometric sample quality information, wherein the first or second biometric sample quality information describes quality of respectively the first or second biometric samples by:
receiving the first or second biometric samples; and
assessing the first or second biometric sample quality of the first or second biometric samples.

* * * * *